United States Patent
Weyburne et al.

(10) Patent No.: US 8,154,792 B1
(45) Date of Patent: Apr. 10, 2012

(54) MULTI-LAYER GALLIUM ARSENIDE-BASED FRESNEL PHASE-SHIFT DEVICE FOR INFRARED WAVELENGTH CONVERSION

(75) Inventors: David Weyburne, Maynard, MA (US);
David Bliss, Arlington, MA (US);
Candace Lynch, Chelmsford, MA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 12/511,101

(22) Filed: Jul. 29, 2009

(51) Int. Cl.
*G02F 1/335* (2006.01)
*H01L 33/00* (2010.01)
(52) U.S. Cl. .................................. 359/332; 385/122
(58) Field of Classification Search .................. 385/122; 359/326–332
See application file for complete search history.

(56) References Cited

U.S. PATENT DOCUMENTS

| | | | | |
|---|---|---|---|---|
| 5,091,756 A | * | 2/1992 | Iga et al. | 257/13 |
| 5,175,739 A | * | 12/1992 | Takeuchi et al. | 372/45.01 |
| 5,365,366 A | * | 11/1994 | Kafka et al. | 359/330 |
| 5,640,480 A | * | 6/1997 | Komine | 385/122 |
| 5,751,466 A | * | 5/1998 | Dowling et al. | 359/248 |
| 6,573,528 B2 | * | 6/2003 | Braddock | 257/14 |
| 6,591,035 B2 | * | 7/2003 | Miller et al. | 385/24 |
| 7,088,884 B2 | * | 8/2006 | Gerken et al. | 385/24 |

* cited by examiner

*Primary Examiner* — Daniel Petkovsek
(74) *Attorney, Agent, or Firm* — AFMCLO/JAZ; Fredric Sinder

(57) ABSTRACT

A new nonlinear optical structure for frequency conversion is described. The new nonlinear optical structure is a multilayer wafer comprising alternating layers of gallium arsenide and aluminum gallium arsenide onto a gallium arsenide substrate. The new device is both more efficient and easier to make than prior art gallium arsenide crystal structures designed for nonlinear optical conversion.

3 Claims, 3 Drawing Sheets

MULTI-LAYER GALLIUM ARSENIDE-BASED FRESNEL PHASE-SHIFT DEVICE FOR INFRARED WAVELENGTH CONVERSION

RIGHTS OF THE GOVERNMENT

The invention described herein may be manufactured and used by or for the Government of the United States for all governmental purposes without the payment of any royalty.

BACKGROUND OF THE INVENTION

The present invention relates generally to optical frequency conversion, and more specifically to a multi-layer gallium arsenide-based Fresnel phase shift optical device for infrared wavelength conversions.

Optical frequency conversion involves fabricating a crystal in which a laser of one frequency is directed through the crystal and a portion of the light converted to another frequency. The conversion process can be understood by considering it as occurring in the visible light range where a portion of a beam of one color, for example, blue, is converted into a beam of another color, for example, red.

There are a number of nonlinear optical materials that have been successfully used for frequency conversion. Very few, however, have been successful in the mid-infrared (IR) optical range. Periodically poled lithium niobate ($LiNbO_3$) is a nonlinear optical material that does work in the mid-IR range. This technology makes use of the ferroelectric property of $LiNbO_3$. An intense electric field is applied to permanently induce a periodic inversion of the crystal structure. This inversion allows for quasi-phase-matching (QPM, a standard nonlinear optics technique for frequency conversion) in that the crystal inversion produces a spatial modulation of the nonlinear optical coefficient. However, the transparency of $LiNbO_3$ is low for wavelengths above 4 microns, limiting its use for IR and Terahertz (THz) sources.

Gallium Arsenide (GaAs) is a more promising material because it is transparent up to 17 microns, has a larger effective non-linear optical coefficient, and can be easily processed using existing semiconductor fabrication method. GaAs is not ferroelectric and an inversion of the crystal cannot be achieved by poling.

GaAs crystals have been shown in the prior art to provide efficient optical frequency conversion into the IR frequency range. The prior art teaches a variety of approaches for fabricating GaAs crystals for this purpose.

In one prior art approach, thin flat plates are used in which the end walls are angled to allow light to enter and exit. Once light enters the angled end wall, it reflects at an angle first off the top and then off the bottom of the plate thereby traveling down the plate from one end to the other. The angled exit end wall allows the newly generated light to easily exit. The reflections off the top and the bottom have an important role in the frequency conversion process and, without them, no frequency conversion occurs. The more reflections, the higher the conversion efficiency.

An improvement on the thin plate approach uses quasi-phase-matching by alternating the crystal orientation, resulting in a change in the sign of the non-linear coefficient. QPM GaAs has been demonstrated using stacks of bonded wafers, as described, for example, in E. Lallier, M. Brevignon, and J. Lehoux, Optics Letters, "Efficient Second-Harmonic Generation of a $CO_2$ Laser with a Quasi-Phase-Matched GaAs Crystal," Vol. 23, pp. 1511-1513 (1998)). There is, however, significant scatter and signal loss associated with the bonded interfaces. QPM structures with periodic reversal of the GaAs orientation have been produced using epitaxial growth on patterned templates, so called Orientation Patterned GaAs (OPGaAs), and IR and THz generation has been observed. This technique, however, requires epitaxial growth of very thick layers (approximately 1 mm) while maintaining the periodically reversed GaAs structure. See, for example, A. Eyres, P. J. Tourreau, T. J. Pinguet, C. B. Ebert, J. S. Harris, M. M. Fejer, L. Becouarn, B. Gerard, and E. Lanier, "All-Epitaxial Fabrication of Thick, Orientation-Patterned GaAs Films for Nonlinear Optical Frequency Conversion," Appl. Phys. Lett., vol. 79, pp. 904-907 (2001). Propagation of the inverted GaAs domains is not always successful, limiting the efficiency of the conversion process.

The OPGaAs method has trouble growing on thin columns. OPGaAs fabrication is based on a photolithography and molecular beam epitaxy (MBE) process that results in a thin-film template with periodic crystal inversions. These periodic crystal inversions consist of many thin, long columns (5-200 µm wide, 4-5 mm long). A thick film (0.5-1 mm) is then grown upon this template by hydride vapor phase epitaxy to produce bulk OPGaAs. The film thickness must be thick enough to allow the pump laser to pass through the columns from the side. One problem with the technique is that it is nearly impossible to grow thin columns high enough to be useful for nonlinear optical applications. The columns close up before useful thicknesses can be obtained.

A third method for obtaining nonlinear optical conversion in GaAs has been described in J. A. Armstrong, N. Bloembergen, J. Ducuing, P. S. Pershan, Phys. Rev., "Interactions Between Light Waves in a Nonlinear Dialectric," vol. 127, pp. 1918-1939 (1962); and, R. Haidar, N. Forget, P. Kupecek, E. Rosencher, "Fresnel Phase Matching for Three-Wave Mixing in Isotropic Semiconductors," J. Opt. Soc. Aim B., vol. 21, pp. 1522-1534 (2004). It is sometimes referred to as Total Internal Reflection Quasi-Phase-Matching (TIR-QPM).

Quasi-phase-matching for this third method is obtained by the use of the Fresnel phase shift that occurs on reflection (bounce) in the non-linear crystal.

One of the disadvantages of the TIR-QPM technique is that the number of phase reversals that can be reasonably produced in GaAs (40-70 bounces) is much less than can be produced in an equivalent OPGaAs structure.

It is, therefore, an object of the invention to provide a new and improved approach for optical frequency conversion using GaAs crystals.

SUMMARY OF THE INVENTION

The present invention provides a new method for fabricating GaAs crystals for frequency conversion. In the new method, many thin GaAs layers are grown on a GaAs plate with each thin GaAs layer separated from the next layer by a thin aluminum gallium arsenide (AlGaAs) layer. The index of refraction change from GaAs to AlGaAs causes some of the pump beam laser light to be reflected. The thin GaAs and AlGaAs layers cause the pump laser to undergo many more reflections than a similar structure without the AlGaAs layers, resulting in increased efficiency of the frequency conversion process.

The unique discovery of the present invention is that a multi-layer GaAs crystal, or crystal wafer, comprising many thin GaAs layers separated by thinner AlGaAs layers causes a pump laser to undergo many more internal reflections than a similar structure without the AlGaAs layers, thus resulting in increased efficiency of the frequency conversion process.

The new invention is more efficient than the prior art TIR-QPM approach because of the increased number of internal reflections, or bounces.

The new invention is more efficient than the more recent prior art OPGaAs approach because its crystal structure is both simpler and much easier to grow using commercially available deposition equipment.

The invention is directed to a nonlinear optical crystal structure, comprising alternating layers of gallium arsenide and aluminum gallium arsenide. The layers of gallium arsenide may be thicker than the layers of aluminum gallium arsenide. The crystal structure may also include a substrate of gallium arsenide under the alternating layers of gallium arsenide and aluminum gallium arsenide. The crystal structure may also have an optical face for input of a laser beam, wherein the optical face is beveled at an acute angle to the laser beam.

The invention is further directed to a method for making a nonlinear optical crystal structure, comprising the step of depositing alternating layers of gallium arsenide and aluminum gallium arsenide onto a substrate. The gallium arsenide layers may be made thicker than the aluminum gallium arsenide layers. The substrate may be made of gallium arsenide.

The invention is yet further directed to a method for optical frequency conversion, comprising transmitting a pump laser beam through a nonlinear optical crystal structure comprising alternating layers of gallium arsenide and aluminum gallium arsenide. The layers of gallium arsenide may be thicker than the layers of aluminum gallium arsenide. The nonlinear optical crystal structure may also have an optical face beveled at an acute angle to the laser beam.

DETAILED DESCRIPTION

Figure 1:
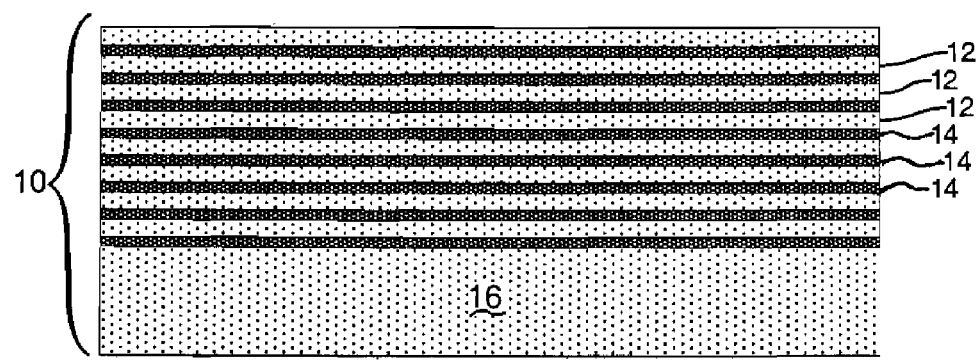
FIG. 1 is a schematic side view of a layered structure for quasi-phase-matching according to the teachings of the present invention showing thin $Al_xGa_{1-x}As$ epitaxial layers sandwiched between GaAs epitaxial layers. The layers are grown on top of a GaAs wafer.

FIG. 1 is a schematic side view of a layered structure 10 for quasi-phase-matching according to the teachings of the present invention showing thin $Al_xGa_{1-x}As$ epitaxial layers 14 sandwiched between GaAs epitaxial layers 12. The layers are grown on top of a GaAs substrate wafer 16.

Figure 2:
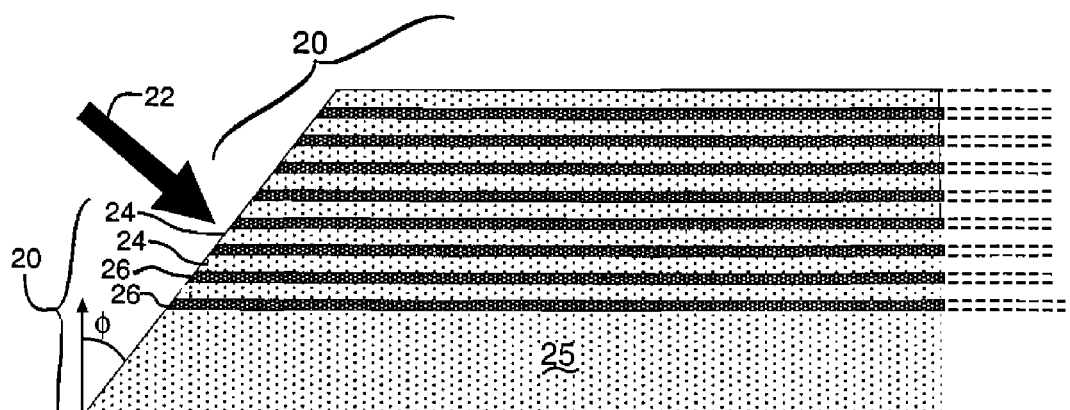
FIG. 2 is a schematic side view of a crystal structure according to the teachings of the present invention showing the input of a pump beam into the crystal and the output of the beam at the other end of the crystal.

FIG. 2 is a schematic side view of another crystal structure 20 according to the teachings of the present invention showing the input of a pump beam 22 into crystal 20. Thin $Al_xGa_{1-x}As$ epitaxial layers 26 are sandwiched between GaAs epitaxial layers 24. The layers are grown on top of a GaAs substrate wafer 25.

Figure 3:
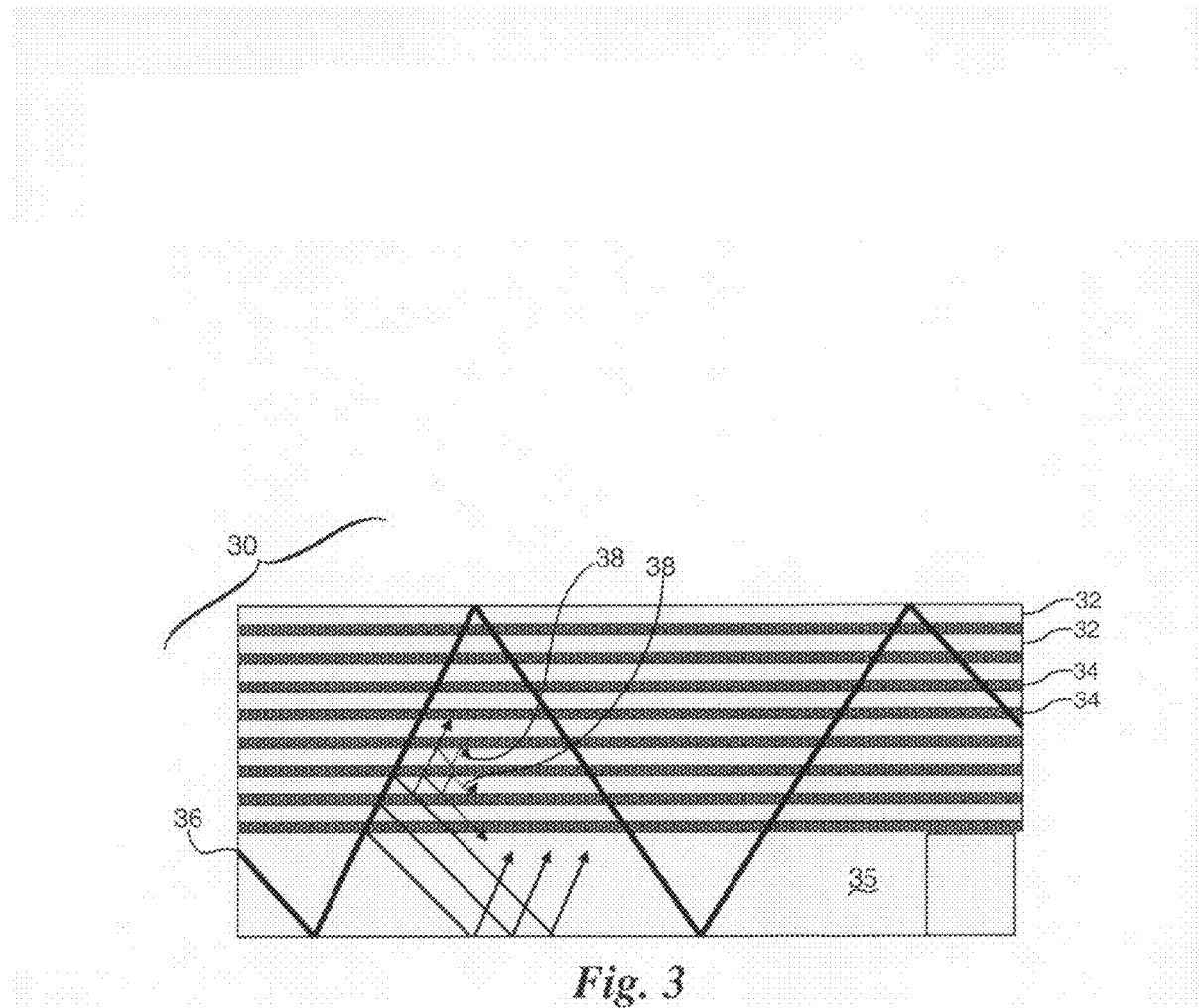
FIG. 3 is a schematic side view of a crystal structure according to the teachings of the present invention showing pump beam propagation through the wafer and generation of some of the daughter beams. A fraction of the radiation incident at each GaAs—AlGaAs interface will be reflected, the rest transmitted. Only some daughter beams are shown and only the start of the propagation of the daughter beams is shown for clarity.

FIG. 3 is a schematic side view of another crystal structure 30 according to the teachings of the present invention showing propagation of a pump beam 36 through wafer structure 30 and generation of daughter beams 38. A fraction of the radiation incident at each GaAs—AlGaAs interface will be reflected and the rest transmitted. Only some daughter beams 38 are shown and only the start of the propagations of daughter beams 38 are shown for clarity.

Figure 4:
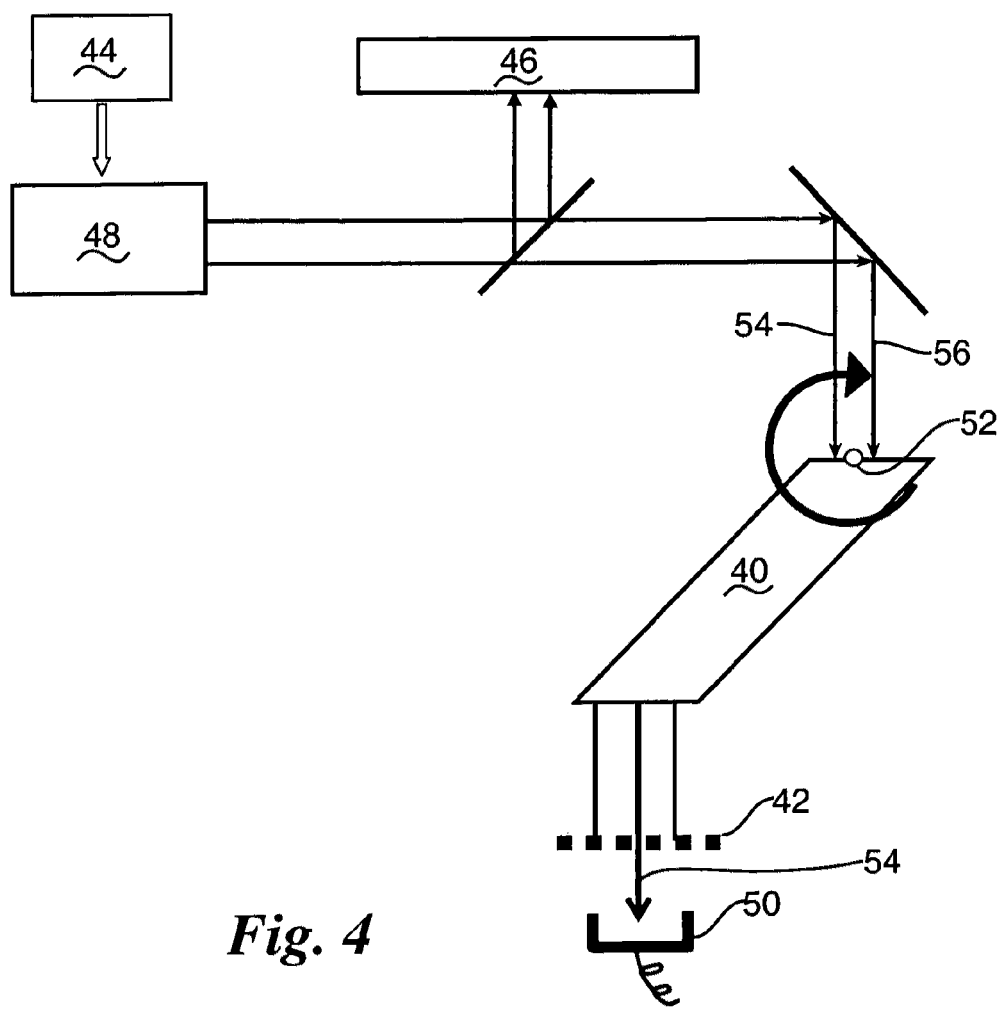
FIG. 4 shows one possible implementation of the new invention. The GaAs crystal wafer is shown on its side. The epitaxial layers (not shown in this view) are parallel to the long sides. In use, the GaAs crystal and filters are mounted on a turn table to allow the angle between the input beams and the GaAs crystal to be changed. This "tuning" will change the wavelength of the generated output beam.

FIG. 4 shows one possible implementation of the new invention. A GaAs—AlGaAs crystal multi-layer wafer 40 is shown on its side. The GaAs and AlGaAs epitaxial layers (not shown in this view) are parallel to the long sides. A pump laser 44 sends a beam through an optical parametric oscillator (OPO) 48. A pair of beams 54 and 56 exit OPO 48, pass through a partially mirrored window for a spectrometer 46 and enter a beveled end of crystal multi-layer wafer 40. In use, GaAs crystal wafer 40 and filters 42 are mounted on a turn table (not shown) along an axis 52 to allow the angle between input beams 54 and 56 and GaAs crystal 40 to be changed. This "tuning" will change the wavelength of the generated output beam 54.

For the new invention, a Fresnel quasi-phase-matched structure may be fabricated by growing many epitaxial layers of GaAs and $Al_xGa_{1-x}As$. FIG. 1 depicts the GaAs wafer with many thin epitaxial layers 14 and 12 of GaAs and $Al_xGa_{1-x}As$ layers. The total thickness of the epitaxial layers plus the wafer must be sufficient to allow easy input and output of the laser beams—approximately 1 mm. However, as the total thickness increases, there will be fewer bounces off the top and bottom surfaces. Therefore, it may be preferable to grind and polish part (or all) of the starting GaAs wafer. In a post-growth processing step, the wafer would be cut into rectangles. The ends of the rectangle may be beveled so that the incident beam would bounce through the crystal from the bottom of the wafer up through the epitaxial layers, bounce off the top of the wafer and continue through the crystal to the output end of crystal wafer 20. The output end (not shown) may also be beveled to allow for easy extraction of the output light. The completely fabricated crystal in the new invention will have the same outward appearance as crystals used in the prior art.

At each GaAs—AlGaAs interface during propagation, the pump beam is partially reflected and the rest transmitted. This is shown in FIG. 3 (only some of the many daughter beams are shown for clarity). The amount reflected is dependent on the index of refraction difference between the GaAs layer and the AlGaAs layer and is an easily calculated quantity. At the top and bottom surfaces, the beams are totally reflected (as long as the angle is below a critical value).

The efficiency of the conversion of the pump beam into the signal and idler beams is dependent on how many bounces the pump beam makes through the crystal. One can see from FIG. 3 that the highest efficiency will be achieved if one could confine the pump beam into just one of the GaAs channels, which is unfortunately not possible. However, it is easily seen that with the new invention, the pump beam and its daughters will undergo many more bounces then without the multilayer structure. The epitaxial layers of GaAs and $Al_xGa_{1-x}As$ may be grown on standard GaAs substrates by hydride vapor phase epitaxy (HVPE) or organometallic vapor phase epitaxy (OMVPE).

The thickness of the each GaAs layer is determined by the phase matching requirements for the propagating beams. This is readily calculated by known formulas for given frequencies of the pump, probe and signal beams and the index of refraction of GaAs at each optical frequency. The thickness of the AlGaAs layer is much thinner and its primary purpose is to cause a partial reflection of the pump beam at each of the GaAs—AlGaAs interfaces (the rest of the beam is transmitted). The percentage of the total incident intensity reflected at each GaAs/Al$_x$Ga$_{1-x}$As interface is a function of the indices of refraction and the angle of incidence. The composition of the Al$_x$Ga$_{1-x}$As layer should be chosen to maximize the reflected intensity at the GaAs/Al$_x$Ga$_{1-x}$As interfaces. The AlAs—GaAs will have the largest index difference and is preferred. However, it is known that very high AlAs fractions deteriorate in moist air. Therefore, it may be advantageous to keep the AlAs fraction at about 50%.

The benefit of using Al$_x$Ga$_{1-x}$As to produce the index difference is the very small lattice parameter mismatch between AlAs (a=5.665 Å) and GaAs (a=5.653 Å) which only produces a very small mismatch strain. The growth of thin Al$_x$Ga$_{1-x}$As layers will therefore not result in dislocation formation and the subsequent GaAs growth will be unstrained.

The present invention has many of the same advantages as the total reflection birefringence method of Haidar et al. Haidar et al. claim that, in their method, Fresnel dephasing at each reflection can compensate for almost any phase lag between interacting waves. This non-resonant phase-matching scenario allows both large tunability and nonlinear device design tolerance compared to the other techniques for obtaining nonlinear optical generation in GaAs. One of the disadvantages of the TIR-QPM scheme of Haidar et al. and others is that the number of phase reversals that can be reasonably produced in GaAs (40-70 bounces) is many times fewer than can be produced in the equivalent OPGaAs structure. A major advantage of the present invention compared to the Haidar et al. TIR-QPM scheme is that because it undergoes many more bounces, it will be more efficient in the nonlinear optical generation. It may approach and even surpass the efficiency of the OPGaAs technique.

One of the advantages of this invention relative to the OPGaAs growth of patterned substrates is the simplicity of the structure. It does not require preparation of a template by lithography, etching, or MBE growth that the OPGaAs requires. A second advantage of the new invention compared to OPGaAs is that it is often difficult to maintain the patterned GaAs domains throughout the epitaxial growth, limiting the total thickness of the structure. The method described in this invention does not have such a limitation as the growth is on a uniform planar substrate.

A third advantage compared to the OPGaAs method is that the OPGaAs method has trouble growing on thin columns. OP—GaAs fabrication is based on a photolithography and molecular beam epitaxy (MBE) process that results in a thin-film template with periodic crystal inversions. These periodic crystal inversions consist of many thin, long columns (5 μm-200 μm wide, 4-5 mm long). A thick film (0.5-1 mm) is then grown upon this template by hydride vapor phase epitaxy to produce bulk OP—GaAs. The film thickness must be thick enough to allow the pump laser beam to pass through the columns from the side. One problem with the technique is that it is nearly impossible to grow thin columns high enough to be useful for nonlinear optical applications. The columns close up before useful thicknesses can be obtained. This is not true for the present invention. It is actually easier to grow thinner layers in the new invention because the growth times to produce a set number of GaAs—AlGaAs pairs will be less.

A fourth advantage of the new invention compared to the OPGaAs technique is that it is possible to use commercially available deposition equipment (for example, MOCVD systems from Axitron or EMCORE) that have light-based thickness monitors for the real time determination of the growth rate of the GaAs and AlGaAs layers. This allows for precise growth of the many GaAs—AlGaAs pairs needed for this application. In principle, it might be possible to do this in the OPGaAs case, but the many columns would interfere with the thickness monitors operation.

It is not possible to calculate the efficiency of the new invention since the total number of reflections is not easily calculated. However, it is possible to calculate is the fraction of the pump beam that is diverted by the many reflections at all of the GaAs—AlGaAs interfaces. Assume that there are m layers of GaAs separated by thin Al$_x$Ga$_{1-x}$As (x=0.5) layers. That makes a total of 2 m interfaces. Following Haidar et al., assume the angle of incidence, $\theta_i$=25°. For a 10 mm long crystal, Haidar et al. measured 41 bounces in a GaAs crystal. Consequently, the pump beam will see 81 m interfaces. For IR beams in the 4-5 μm range, it is known that the coherence length of a λ=2 μm pump laser in GaAs is about 20 μm. Assuming a total of about 500 μm of epi is grown, this corresponds to about 25 layers of GaAs. Therefore, the total number of interfaces, $m_T$, is $m_T$=2025 in this example.

What is the fraction of λ=2 μm light that is reflected at each interface?

The index of refraction of AlGaAs is calculated according to Gehrsitz et. al., "The Refractive Index of Al$_x$Ga$_{1-x}$As Below the Band Gap: Accurate Determination and Empirical Modeling," *J. Appl. Phys.*, vol. 87, pp. 7825-7837 (2000). At λ=2 μm, $n_{GaAs}$=3.34363 for GaAs and $n_{AlGaAs}$=3.0976 for 50% AlGaAs (x=0.5). For comparison, $n_{GaAs}$=3.3389 for GaAs (from T. Skauli et al., "Improved Dispersion Relations for GaAs and Applications to Nonlinear Optics," *J. Appl. Phys.*, 94, 6448-6455 (2003)).

From Snell's law, $$n_{GaAs}\sin(\theta_i) = n_{AlGaAs}\sin(\theta_t)$$

The angle of the transmitted beam is θ=27.14°. Fresnel's equations give the reflection coefficient, $r_p$, for the parallel polarization case:

$$r_p = \frac{\tan(\theta_t - \theta_i)}{\tan(\theta_t + \theta_i)}$$

and for the perpendicular polarization case, $r_s$, as $$r_s = \frac{\sin(\theta_t - \theta_i)}{\sin(\theta_t + \theta_i)}$$

This means that the reflected and transmitted energy is given by:

Parallel polarization case:

Reflected Energy=$r_p \cdot r_p^* = r_p^2$=0.0844%.

Transmitted Energy=$1-r_p^2$=99.9155%.

Perpendicular polarization case:

Reflected Energy=$r_p \cdot r_p^* = r_p^2$=0.2239%

Transmitted Energy=$1-r_p^2$=99.776%.

With the above information, it is possible to calculate the fraction of the pump beam that will be diverted by m layers of GaAs separated by thin $Al_xGa_{1-x}As$ (x=0.5) layers. For a 10 mm long crystal, the total number of interfaces, $m_T$, is $m_T$=2025. At each interface, the transmitted fraction is 0.999155 for the parallel polarization case and 0.99776 for the perpendicular polarization case. Thus, for $m_T$ interfaces:

Fraction remaining perpendicular case=$0.999155^{m_T}$=0.18 and

Fraction remaining parallel case=$0.999155^{m_T}$=0.01

Thus, in this example multilayer structure, the pump beam polarized in the perpendicular direction loses 82% of its energy creating daughter beams. For the parallel polarization case, the multilayer structure diverts 99% of the pump beam.

The teachings of the disclosed new and improved approach for optical frequency conversion using GaAs crystal wafers comprising alternating GaAs and AlGaAs layers, while specialized, will find application in other areas where combining different optical materials can produce optical devices having improved optical performance properties.

Terms used in the claims are used with their ordinary meanings as understood by those with skill in their application art areas. For example, while the term "wafer" may technically refer to a single layer, in practice, wafers are usually thought of a multi-layered. Similarly, the term "crystal," which may be thought of as referring to a crystal of a single material, will be understood by those with skill in the art to refer to a multi-material "crystal" when required by the context. The more general term, "structure," is used in the claims to broadly include any unintended limitations caused by the use of terms such as "wafer" and "crystal."

Various modifications to the invention as described may be made, as might occur to one with skill in the art of the invention, within the scope of the claims. Therefore, all contemplated embodiments have not been shown in complete detail. Other embodiments may be developed without departing from the spirit of the invention or from the scope of the claims.

We claim:

1. A nonlinear optical crystal structure, comprising contiguous alternating layers of gallium arsenide and aluminum gallium arsenide, wherein every layer of gallium arsenide is a first thickness greater than about 1 mm and every layer of aluminum gallium arsenide is a second, thinner, thickness.

2. The nonlinear optical crystal structure according to claim 1, further comprising a substrate of gallium arsenide under the alternating layers of gallium arsenide and aluminum gallium arsenide.

3. The nonlinear optical crystal structure according to claim 1, having an optical face for input of a laser beam, wherein the optical face is beveled at an angle to the planes of the alternating layers of gallium arsenide and aluminum gallium arsenide.

* * * * *